United States Patent [19]

Carter

[11] 4,131,266
[45] Dec. 26, 1978

[54] ADJUSTABLE SHOCK ABSORBER

[75] Inventor: Walter L. Carter, Troy, Mich.

[73] Assignee: Jackson Machine Products, Madison Heights, Mich.

[21] Appl. No.: 843,561

[22] Filed: Oct. 19, 1977

[51] Int. Cl.² .............................................. F16F 9/48
[52] U.S. Cl. .................................... 267/34; 188/288; 188/299; 188/315
[58] Field of Search ............... 267/34, 64 B; 188/284, 188/285, 286, 288, 299, 315, 316, 318; 213/43

[56] References Cited

U.S. PATENT DOCUMENTS

| | | | |
|---|---|---|---|
| 1,160,976 | 11/1915 | Myers | 188/288 |
| 3,493,124 | 2/1970 | Thompson | 188/288 |
| 3,605,960 | 9/1971 | Singer | 188/315 |
| 3,666,256 | 5/1972 | Ellis et al. | 267/34 |
| 3,682,103 | 8/1972 | Schwam | 213/43 |
| 3,731,770 | 5/1973 | Bindon | 188/285 |
| 3,794,309 | 2/1974 | Chrokey et al. | 267/34 |
| 3,896,908 | 7/1975 | Petrak | 188/286 |
| 3,918,693 | 11/1975 | Zahid | 267/34 |
| 4,059,175 | 11/1977 | Dressell et al. | 188/285 |

FOREIGN PATENT DOCUMENTS 466271  10/1951  Italy ........................... 188/318

Primary Examiner—Edward R. Kazenske
Attorney, Agent, or Firm—Basile and Weintraub

[57] ABSTRACT

A shock absorber having a housing with a piston chamber and a radially spaced accumulator chamber. A piston rod having a piston at its inner end is slideably mounted in the piston chamber, while the outer end of the piston rod extends outwardly from the shock absorber housing wherein it is provided with a striker plate which is initially positioned for engagement by a load to be decelerated. The fluid passage between the accumulator and the piston chambers is provided with a tapered metering slot designed to communicate a lesser amount of oil between the piston and the accumulator chambers as the piston is decelerated, resulting in a gradual deceleration of the load exerted on the piston. An adjustable metering valve carried by the shock absorber housing is utilized to communicate oil from the piston chamber when a load is exerted on the striker plate which is less than the maximum amount the shock absorber may receive. A spring is carried by the shock absorber to return the piston rod to its initial position after the shock load has been dissipated so as to normally maintain the piston rod in an initial position ready for the receipt of a load and to decelerate the same.

4 Claims, 3 Drawing Figures

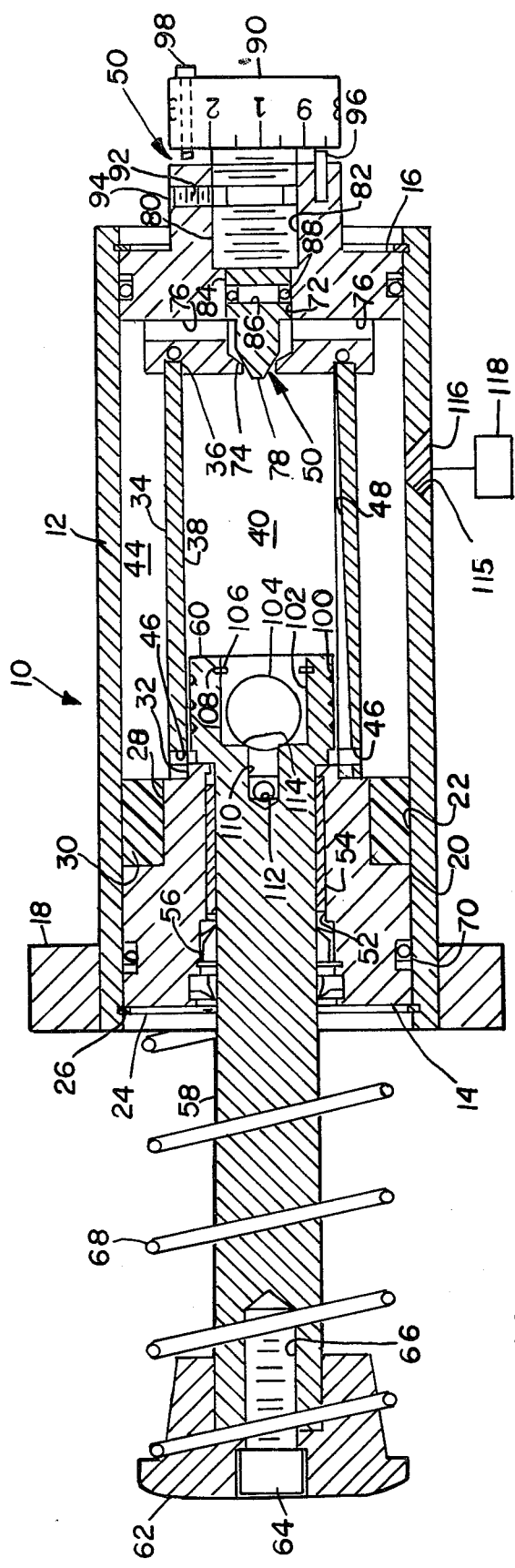

ADJUSTABLE SHOCK ABSORBER

BACKGROUND OF THE INVENTION

1. Field of the Invention

The present invention relates generally to shock absorbers and, more particularly, to a novel and improved shock absorber which provides a gradual deceleration of a load.

2. Description of the Prior Art

Fluid-flow control apparatuses of the type used as shock absorbers have generally been characterized by complex cylinder and piston assemblies utilizing a considerable number of components to effect absorption or dampening of forces applied to the piston assembly of the shock absorber. Typically, the shock absorbing apparatuses of the prior art include a piston member which is axially movable within a fluid-filled cylinder in response to forces applied to the piston rod. Typical piston arrangements include fixed orifices extending through the piston so that fluid can flow from one side of the piston to the other side as the piston is moved axially within the cylinder. In some conventional shock absorbers, in addition to the fixed passageways through the piston, a spring-loaded plate may be used so that when the fluid pressure on the piston exceeds a predetermined value, the plate will move and open a normally closed relief orifice. Examples of apparatuses of the type aforementioned are described in U.S. Pat. Nos. 3,896,908; 3,731,770; and 3,794,309. In other examples of the prior art such as disclosed in U.S. Pat. Nos. 3,666,256 and 3,605,960, the sleeve member within which the piston is reciprocally mounted is provided with one or more radially disposed orifices which will communicate the fluid within the piston chamber to an accumulator chamber radially displaced therefrom. The aforementioned patents disclose means for varying the size of the orifice through a manually operated and externally mounted mechanism. In all of the aforementioned patents the apparatuses generally include a fixed side passage, either through the piston member or the sleeve member; and while such an orifice may be initially varied (with the exception of the subject matter disclosed in U.S. Pat. No. 3,896,908), the size of the orifice remains constant during movement of the piston. Accordingly, pressure resistant to piston movement within the cylinder is dependent upon the speed of the piston as it advances axially through the cylinder. Since the fluid is allowed to flow through the aforementioned passageways, either in the piston or its sleeve, there will be relatively little resistance to slow the movement of the piston; but as the speed of the piston member is increased, the resistance will increase. An example of a prior art apparatus which employs an adjustable or varied sized orifice to effect the rate of deceleration of the piston is disclosed in U.S. Pat. No. 1,160,976.

While adjustable shock absorbers and the like have been provided heretofore, it should be noted that they are generally costly and complex and, accordingly, do not economically provide for the deceleration action when such operation is required.

3. Prior Art Statement

In the opinion of the applicant, the above-mentioned patents represent the closest prior art of which applicant is aware.

SUMMARY OF THE INVENTION

The present invention, which will be described subsequently in greater detail, comprises a fluid shock absorber having a housing within which is disposed a piston sleeve that divides the housing into a piston chamber and a radially displaced accumulator chamber, the opposite ends of which are enclosed by front and rear housing enclosures. The front housing enclosure reciprocally mounts a piston rod, the inner end of which is provided with a piston that is reciprocally mounted within the piston chamber to divide the piston chamber into a first high-pressure chamber and a second low-pressure chamber. The piston sleeve is provided with one or more tapered slots disposed at varied angles for decelerating the piston in a gradual manner when the piston is subjected to engagement with a load to be decelerated. The rear housing enclosure is provided with an adjustable metering valve utilized to communicate oil from the piston chamber to the accumulator chamber for lesser loads than the maximum of which the shock absorber is designed to accommodate.

It is therefore a primary object of the present invention to provide a new and improved shock absorber which functions to gradually decelerate a load to a smooth stop.

It is a further object of the present invention to provide a shock absorber of the type described herein which has a simplified, fluid-flow control means wherein the speed of movement of a piston member through a cylinder may be more accurately controlled to accommodate a smooth and rapid deceleration of a load.

It is a further object of the present invention to provide a new and improved shock absorber of the type described which has adjustable features to permit a variation in the rate at which a load may be decelerated.

It is yet a further object of the present invention to provide a shock absorber of the type described which is of a simple and efficient design and, thus, more economical to manufacture and reliable in its use.

Other objects, advantages and applications of the present invention will become apparent to those skilled in the art of shock absorbers when the accompanying description of one example of the best mode contemplated for practicing the invention is read in conjunction with the accompanying drawing.

BRIEF DESCRIPTION OF THE DRAWING

The description herein makes reference to the accompanying drawing wherein like reference numerals refer to like parts throughout the several views, and wherein:

FIG. 1 is a longitudinal, cross-sectional view through a shock absorber constructed in accordance with the principles of the present invention;

FIG. 2 is a fragmentary, cross-sectional view through the piston sleeve illustrated in FIG. 1; and FIG. 3 is an end elevational view of the piston sleeve illustrated in FIG. 2 of the drawing.

DESCRIPTION OF THE PREFERRED EMBODIMENT

Referring now to the drawing and, in particular, to FIG. 1 wherein there is illustrated one example of the present invention in the form of a fluid shock absorber 10 comprising a tubular housing 12 having a bore 22 enclosed at its front and rear ends, respectively, by front enclosure 14 and rear enclosure 16 to provide a fluid-filled interior which will be described in greater detail hereinafter. The front end of the tubular housing 12 has a mounting flange 18 which provides a convenient means for mounting the shock absorber 10 in the desired position. The front enclosure 14 has a circular, peripheral surface 20 which is slideably received within the housing bore 22. The front enclosure 14 is secured to the tubular housing 12 by means of a retainer 24 that snap lockingly engages a circular recess 26 formed in the bore 22. The front enclosure 14 includes a reduced, diametered hub 28 which supports a closed cell sponge 30, the purpose of which will be described hereinafter. The innermost end of the front enclosure 14 is provided with a circular lip 32 which supports the front end of a circular piston sleeve or metering tube 34, while the opposite or rear end of the piston sleeve 34 is received and supported within a circular recess 36 formed in the front face of the rear enclosure 16.

The interior piston sleeve bore 38 of the piston sleeve 34 defines a piston chamber 40, while the outer surface of the piston sleeve 34 in conjunction with the interior surface of the tubular housing bore 22 defines an annular accumulator chamber 44 which is radially spaced from the piston chamber 40. The chamber 44 communicates with the piston chamber 40 by means of a plurality of radially extending ports 46 disposed at the front end of the piston sleeve 34. Communication with the piston chamber 40 is also accomplished by means of a tapered metering slot 48 and a metering valve 50, all of which will be described in greater detail hereinafter.

The front enclosure 14 further comprises an internal bore 52 which supports a bearing 54 and a rod, seal and wiper assembly 56. The bearing 54, in turn, slideably supports a piston rod 58, the inner end of which has a piston 60 formed thereon. The piston rod 58 is reciprocal within the bearing 54 such that the piston 60 may reciprocate within the piston sleeve 34. The outer end of the piston rod 58 has a striker plate 62 attached thereto by means of a threaded fastener 64 which threadingly engages a bore 66 formed in the front end of the piston rod 58. A suitable coil spring 68 sandwiched between the striker plate 62 and the front end of the shock absorber housing 12 biases the striker plate 62 (and, thus, the piston rod 58) outwardly to an initial impact position. In the initial impact position the piston 60 is positioned in the sleeve 34 at the left-most end, as illustrated in FIG. 1 of the drawing.

The rod, seal and wiper assembly 56 functions in a conventional manner to wipe the surface of the piston rod 58 to remove foreign particles therefrom, while the seal functions to retain the pressure fluid within the interior of the tubular housing 12. An O-ring seal 70 is strategically located between the interior surface of the housing bore 22 and the peripheral edge 20 of the front enclosure 14 to provide a simple means of preventing the passage of pressure fluid thereby.

The rear enclosure 16 has a central through bore 72 which terminates in a valve seat 74 at the inner end of the rear enclosure 16. The enclosure 16 further comprises a plurality of radially extending passageways 76 which communicate the bore 72 and the valve seat 74 and, thus, the piston chamber 40 with the accumulator chamber 44. The rate at which fluid is communicated between the piston chamber 40 and the accumulator chamber 44 is determined by the effective cross-sectional area or flow path between the valve seat 74 and a conically shaped valve member 78 which may be moved toward and away from the valve seat 74 in the manner to be described hereinafter. The metering valve 50 comprises a threaded surface 80 that threadingly engages a mating surface 82 formed in the rear of the central bore 72. The inner end of the metering valve 50 has a stem portion 84 which carries the valve member 78. An annular recess 86 formed in the stem 84 carries an O-ring 88 which sealably engages the wall of the bore 72 so as to prevent the passage of fluid thereby. The outer end of the metering valve 50 is provided with a knob member 90 which permits the rotation of the metering valve 50 to move the conically shaped valve member 78 toward and away from the valve seat 74. It is obvious that when the metering valve knob member 90 is rotated in a clockwise direction, the valve member 78 will move toward and into engagement with the valve seat 74 thereby decreasing and/or actually closing off communication across the valve seat 74. Rotation of the knob member 90 in a counterclockwise direction will move the valve member 78 away from the valve seat 74, thereby opening and increasing the effective cross-sectional area of the flow path therethrough and thereby increasing the rate of flow of fluid from the piston chamber 40 through the radial passages 76 and to the accumulator chamber 44. A threaded bore 92 in the end section of the rear enclosure 16 receives a lock screw 94 which is adapted to engage the peripheral surface of the metering valve threaded surface 80 so as to lockingly secure the valve in a desired position once it has been set. The knob 90 of the metering valve 50 is provided with suitable indicia which indicates the amount of opening of the valve seat 74, and correlation of the indicia with a stop pin 96 provides the user with a simple means for adjusting and setting the metering valve 50. A stop screw 98 carried by the metering valve knob member 90 limits the amount of rotational movement of the knob 90 with respect to the valve stop pin 96 and, thus, prevents its accidental removal.

The piston 60 has a plurality of annular grooves 100 to provide for an effective lubrication between the peripheral surface of the piston 60 and the interior surface of the piston sleeve bore 38. The interior of the piston 60 has a bore 102 which accommodates a check valve member 104. A retainer clip 106 provided in an annular recess 108 in the piston bore 102 maintains the check valve member 104 within the bore 102. The inner end of the piston bore 102 communicates with a longitudinal passage 110 which, in turn, communicates with a lateral port 112. A seat 114 at the intersection of the passageway 110 and the bore 102 is engaged by the check valve 104 to prevent communication between the opposite sides of the piston 60 during movement of the piston 60, as will be described hereinafter.

The housing 12 further comprises a port 115 which is enclosed by a cap 116; however, it should be understood that the cap 116 may be removed and a suitable coupling inserted therein which would connect the accumulator chamber 44 to an external accumulator 118 if additional capacity is necessary due to the operation of the unit in high-speed applications.

In operation the shock absorber 10 is positioned so that the striker plate 62 is in the path of a moving load which is desired to be decelerated. The interior chamber of the shock absorber 10 is filled with a suitable hydraulic fluid, and any necessary bleeding operations may be carried out through the port 115. The coil spring 68 moves the piston rod 58 to the initial shock absorbing position shown in FIG. 1. The metering valve 50 is set to the desired opening of the meter valve member 78 with respect to the valve seat 74, and the shock absorber 10 is then in an operative position for decelerating a load. When a moving load to be decelerated engages the striker plate 62 at the end of the piston rod 58, the fluid in the high-pressure side of the piston chamber 40, that is, the portion of the piston chamber 40 ahead of the piston 60 (to the right of the piston as viewed in FIG. 1), is forced through both the tapered metering slots 48 across the valve seat 74 into the accumulator chamber 44. The resistance to the fluid flow caused by the metering slots 48 and the flow across the valve seat 74 governs the shock absorbing internal pressures which generate the resisting forces to stop the external load. The check valve ball 104 is seated against the check valve seat 114 and, thus, closes the passageway 110. The fluid continues to pass into the accumulator chamber 44 during the entire displacement of the piston 60. It can be seen that since the metering slots 48 are tapered and may be of any desired, varied angle, depending upon the particular application, the piston 60 decelerates the load acting on the striker plate 62 of the piston rod 58. As the piston 60 passes over the tapered slots 48, a lesser amount of the hydraulic fluid is dispensed through the tapered slot 48, as it is being continuously closed off by the moving piston 60. It is obvious that such a relationship with respect to the movement of the piston across the tapered metering slot 48 in conjunction with the constant flow of fluid across the valve seat 74 results in a gradual deceleration of the external load acting on the piston, and the load will come to a smooth stop.

It should be noted that the sponge 30 contracts to provide additional volume for the fluid displaced by the piston rod 58. When the weight of the load on the piston 60 is released, the spring 68 returns the piston rod 58 to the left, as viewed in FIG. 1, to the initial, operative position. The sponge 30 then expands and the fluid under pressure in the accumulator chamber 44 will be forced back through the tapered metering slot 48. Fluid will also be forced back through the port 112 and axial passageway 110 to force the ball check valve 104 off the seat 114 and to permit the fluid to pass back through the bore 102 and into the piston chamber 40.

It can thus be seen that applicant has disclosed a new and improved shock absorber which provides for a smooth deceleration in a manner which is of considerable advantage over the prior art structures and one which may be accomplished in an economical manner due to the simplicity of the design and construction of applicant's inventive shock absorber.

It should be understood by those skilled in the art of shock absorbers that other forms of applicant's invention may be had, all coming within the spirit of the invention and scope of the appended claims.

What is claimed is as follows:

1. A fluid shock absorber comprising:
 a housing having a longitudinal bore;
 a sleeve longitudinally positioned in said housing bore to define a piston chamber within said sleeve and an accumulator chamber in the annular space between said sleeve and said housing;
 pressure fluid in said chambers;
 a piston rod having a piston at its inner end, said piston having a rod end and a head end, said piston being slideably mounted in said piston chamber to divide said piston chamber into a high-pressure chamber at the head end of said piston and a low-pressure chamber at the rod end of said piston, the other end of said piston rod extending outwardly of one end of said housing to an initial position for engagement by a member to be decelerated;
 first support means carried at said one end of said housing for slideably supporting said piston rod, said first support means sealingly engaging said housing while supporting one end of said sleeve in said longitudinal position;
 second support means carried at the other end of said housing for sealingly engaging said housing while supporting the other end of said sleeve in said longitudinal position, said sleeve having a longitudinally disposed, tapered slot along its inside surface, said tapered slot providing a fluid passage axially along the outside surface of said piston connecting said high-pressure chamber to said low-pressure chamber, said tapered slot having a small cross-sectional area near said other end of said sleeve and a large cross-sectional area near said one end of said sleeve such that movement of said piston from said one end of said sleeve toward the other end of said sleeve reduces the effective cross-sectional area of said fluid passage and, thus, reducing the rate at which fluid flows from said high-pressure chamber to said low-pressure chamber;
 means communicating the larger cross-sectional area end of said slot to said accumulator chamber;
 said second support means having a through bore which terminates in a valve seat, said valve seat communicating with said high-pressure chamber;
 said through bore having a radially disposed passage communicating with said accumulator chamber;
 valve means disposed in said through bore, said valve means having a conically shaped end engaging said valve seat;
 said valve means having a threaded body threadingly engaging said second support means;
 said valve means having a knob at its external end, said knob having indicia thereon;
 a stem, said stem being disposed between said conically shaped end and said threaded body, said stem slidingly engaging said through bore, said stem having a recess formed therein, said recess having means for sealingly engaging said through bore;
 said conically shaped end being selectively movable toward and away from said valve seat by rotating said knob to provide an externally adjustable restriction between said high-pressure chamber and said accumulator chamber;
 said second support member having a threaded bore laterally disposed and entering said through bore;
 a lock screw carried in said threaded bore, said lock screw lockingly engaging said valve body;
 a stop pin carried at the periphery of said knob, said pin projecting toward said second support member, and;
 a second stop pin carried by said second support member, said second stop pin being engaged by said first pin to allow only one revolution of movement of said knob.

2. The fluid shock absorber defined in claim 1 further comprising:
 an annular recess formed on the interior surface of said first support means; and
 an annular compression sponge mounted to said annular recess, said compression sponge being in communication with said accumulator chamber.

3. The fluid shock absorber defined in claim 1 further comprising means for returning said piston rod to an initial position after a shock load is removed from said piston rod and for normally maintaining said piston rod in said initial position.

4. The fluid shock absorber defined in claim 3 wherein said means for returning said piston rod to an initial position comprises a spring means.

* * * * *